United States Patent
Nicol

[15] 3,661,603
[45] May 9, 1972

[54] NOVEL LIGHTWEIGHT ASBESTOS CONTAINING CEMENTITIOUS MATERIAL AND PROCESS FOR PRODUCING THE SAME

[72] Inventor: John Paul Nicol, Thetford Mines, Quebec, Canada

[73] Assignee: Asbestos Corporation Limited, Thetford Mines, Quebec, Canada

[22] Filed: Apr. 7, 1970

[21] Appl. No.: 26,415

[30] Foreign Application Priority Data

Apr. 8, 1969 Great Britain......................17,905/69

[52] U.S. Cl....................................106/90, 106/86, 106/99, 106/308
[51] Int. Cl.....................................C04b 31/04, C04b 31/40
[58] Field of Search ................................106/99, 86, 90, 308

[56] References Cited

UNITED STATES PATENTS

| 2,626,213 | 1/1953 | Novak | 106/308 |
| 2,568,023 | 9/1951 | Perry | 106/99 |
| 2,198,800 | 4/1940 | Badollet | 106/99 |

*Primary Examiner*—Tobias E. Levow
*Assistant Examiner*—W. T. Scott
*Attorney*—Alan Swabey

[57] ABSTRACT

A lightweight, rigid composition is prepared by a process comprising mixing water, a cementitious material, asbestos fibers and an anionic surfactant capable of chemically opening the fiber and resistant to alkalis and saponification. The product may be cellular, in which case it may additionally include a different surfactant, a sequestering agent or a colloidal dispersion.

24 Claims, No Drawings

NOVEL LIGHTWEIGHT ASBESTOS CONTAINING CEMENTITIOUS MATERIAL AND PROCESS FOR PRODUCING THE SAME

BACKGROUND OF THE INVENTION

The invention relates to a novel lightweight inorganic composition and to a process for producing the same. More particularly, this invention relates to an asbestos fiber-containing cementitious lightweight composition and to a process for producing the same.

SUMMARY OF THE INVENTION

In accordance with a tangible embodiment of the present invention, a lightweight product is obtained by mixing together water, a cementitious material, chrysotile asbestos fiber and at least 5 percent by weight of said fiber of a surfactant as more fully defined hereinafter and curing the mixture. Additionally, a sequestering agent, or other agents as will be more fully described hereinafter, may be present.

The mixing must be effective to cause a dispersion of the asbestos fiber. In formulations requiring the use of a sequestering agent, it is preferred to mix together water, cementitious material and sequestering agent separately from the asbestos fibers and surfactant. Moderate or slow agitation of the entire mixture will result in a product containing a uniform dispersion of chemically opened asbestos fibers and cementitious material. When agitation is increased to the point where air is introduced in the mixture, it has unexpectedly been found that foaming takes place. The foamed product is stable upon curing.

Commercial Canadian chrysotile asbestos as supplied by the mines and milled by normal milling methods has a specific surface area between 3,000 and 14,000 cm²/gram. Harsher physical opening of the fibers such as obtained by high speed pulverizing e.g. Raymond Mill, can increase the surface area to around 20,000 cm²/gram. Use of still harsher means such as Ball Milling can increase the specific surface to around 25,000 cm²/gram as measured by conventional air permeability methods. However, severe physical opening of Canadian Chrysotile asbestos results in some fiber destruction. In comparison, chemically opened asbestos causes surface areas as high as 200,000 cm²/gram. (calculated) with a percentage of the fibers having colloidal dimensions. The fibers in water exhibit hydrophilic colloidal properties including electrophoresis, high viscosity and film forming characteristics.

The "chemically opened" asbestos fibers referred to, are the subject of U.S. Pat. No. 2,626,213. In accordance with the method described therein, chrysotile asbestos fiber bundles are opened and dispersed to separate, individualize and disseminate the fibers, and to produce therefrom an alkaline, gelatinous, stable, aqueous dispersion, composed predominantly of fibro-colloidal asbestos fibers or fibrils. This is achieved by treating said fiber bundles with an aqueous solution of organic detergent surface-active material which is adsorbed on the surface of the asbestos and is effective in disrupting the molecular bond between fibers. An excess of surface active agent is employed to maintain the opened fibers in fluid dispersion. The asbestos is thus reduced in large measure to colloidal size particles and these are held in a state of colloidal dispersion.

In accordance with the aforesaid patent, the resulting opened fiber shows a range of diameters between 200 and 500 Angstrom units. The resulting dispersion can, of course, contain a small proportion of fibers which have not been opened chemically, some of which are only partially opened and others which are even smaller in diameter than the above.

The treatment of the asbestos fibers with a surface active agent in accordance with the present invention results in "chemically opening" the fibers. In preferred methods of the present invention the degree of chemical opening may be qualitatively assessed by stretching a drop of colloidal asbestos dispersion when a tenuous fibro-colloidal "filament" is obtained. A high degree of chemical opening is shown by a stable "filament" of about 1½ inch length. A low degree of opening is shown by a filament of about ¼ inch length. Another rapid method for assessment of the degree of chemical opening which is semi-quantitative in nature, is measurement of the viscosity, of a colloidal asbestos dispersion. The higher the viscosity, the greater the degree of fiber opening. It has also been found that the greater the fiber length, the higher the viscosity.

In semi-quantitative terms:

$$\frac{\text{Viscosity}}{\text{Fibre concentration}} = f \text{ (fibre length)/(fibre diameter)}$$

A suitable instrument for measurement of viscosity is a Brookfield Synchro-Lectric Viscometer, Model HBT.

In the case of aerated systems, measurement of viscosity also seems a measure of the quality of the foam system.

Preferred surfactants to chemically open chrysotile fiber are of the anionic type and include representative compounds from each group within the general class of anionic surface active agents. The classifications used are taken from McCutcheon's, "Detergents and Emulsifiers, 1968 Annual." Reference Table I is a list of suitable anionic surfactants. It is to be understood however that this list indicates preferred embodiments of this invention and is given by way of illustration only, as additional agents within the spirit and scope of the invention will become apparent to those skilled in the art. In the process of the present invention, the cementitious material used may tend to break down the surfactant unless it is particularly chosen. For example, normal Portland Cement tends to break down a surfactant such as di-octyl sodium sulfosuccinate. The surfactant must in general therefore be an anionic type which is not sensitive to alkalinity and will resist saponification. It must at the same time, as will be clear, be capable of opening up the fiber.

The chemically open fibers are maintained in a state of colloidal dispersion. A sufficient amount of surface active agent must be present to maintain these fibers in a stable state of dispersion. The amount of surface active agent required depends on the concentration of active ingredient in the surfactant. 0.4 to 0.9 percent or more by weight (active ingredient) surfactant should be used based on the weight of cementitious material. However, as much as 2–4 percent should be used to obtain products of lower density. Since excess amounts of surface active agent will increase the required setting time at a given temperature, they should be avoided.

Cementitious materials include Portland Cements, High alumina Cement, and combinations of lime and naturally occurring or artificial pozzolanas. Part of the Portland Cement may also be replaced by Pozzolanic material. Part of it may also be replaced by silica flour, the successful application of which requires high temperature autoclaving. The addition of silica results in a product of increased temperature resistance. Portland Cement is made by heating a mixture of selected clay and limestone to incipient fusion and grinding the resulting clinker to a fine powder. There are five main types as regards usage as described in A.S.T.M. designation C 150–65.

High alumina cement or aluminous cement contains less lime and silica than Portland Cement and is richer in alumina. It is manufactured from chalk or limestone and bauxite, which are mixed together dry and then heated until molten. The resulting product is then ground to a fine powder. In a preferred embodiment of this invention the aluminous cement is used in partial replacement of Portland Cement and permits much more rapid set at normal temperatures. A typical aluminous cement of commerce is Ciment Fondu, a proprietory cement manufacture by Lafarge Aluminous Cement Co. A Pozzolana is a siliceous material which in finely divided form will react with lime at normal temperatures to form compounds having cementitious properties. A naturally occurring Pozzolana which has been found very effective in this invention is Diatomaceous Earth. When used in place of part of the Portland Cement, the diatomaceous earth offers the advantage in formulations requiring the use of sequestering agents, that less of the latter is required. A further advantage is that hardening of the lightweight cementitious material combined with good strength, may be effected in a matter of hours, using only moderate temperatures, e.g. 150°F.

The lightweight cementitious product of the present invention should have a ratio of cementitious product to water from about 1:1½ to about 1:15.

Where sequestering agents are required, e.g., for the aeration of asbestos, chemically opened by "DUPONOL G" (trade mark) in the presence of Portland Cement, the sequestering agent is chosen for its ability to chelate the calcium ions, Ca$^{++}$, of the Portland Cement. Effective agents include sodium hexametaphosphate, sodium salts of ethylenediamine tetraacetic acid, sodium tripolyphosphate or the sodium salt of nitrilotriacetic acid. In place of the sodium salt, other water soluble salts, e.g., K$^+$, NH$_4^+$ can be used. The sequestering agent can be added at once or in portions over a period of time.

The sequestering agent should be used in a ratio of at least 0.5 parts, preferably 2 parts per 100 parts cementitious material. However, as noted, when part of the cementitious material is replaced by material that does not contribute ions such as Ca$^{++}$ e.g. diatomaceous earth, the amount of sequestering agent can be reduced accordingly.

Another group of chemicals that impart foaminess to chemically opened chrysotile asbestos in the presence of heavy metal ions such as supplied by Portland Cement are surfactants themselves. The latter may themselves have little or no tendency to chemically open fibers but have been found effective in promoting aeration. These surfactants may be of the anionic, amphoteric, or nonionic types. They include surfactants from the following classes: sarcosine, phosphate, betaine, diphenyl sulfonate, lanolin, sorbitan, thio and mercapto derivatives; alkyl, naphthalene, dodecyl, tridecyl benzene sulfonates; alcohol sulfates; ethoxylated alcohol sulfates of ethoxylated alcohol; sulfated ethoxylated alkyl phenols; ethoxylated alcohols, alkyl phenols, amines, amides, fatty acids, fatty esters and oils; alkanolamides; taurates; glycol esters; monoglycerides and derivatives; imidazoline type products; tertiary amine oxides. An example of a nonionic type is "ALROSOL C" (trade mark) a fatty alkylol amide condensate, supplied by Geigy Industrial Chemicals. In a preferred embodiment of this invention chrysotile fiber is chemically opened by "DUPONOL G" (trade mark) in the presence of "ALROSOL C" (trade mark). The cementitious material such as Portland Cement is added, and on high speed agitation a voluminous foam is produced which sets satisfactorily at room temperature. Reference table II is a list of suitable auxiliary surfactants to be used in conjunction with chemically opened fiber and cementitious material.

This auxiliary foaming agent can be used in amounts as high as 4 percent minimum based on the weight of cementitious material or as low as 0.3 percent minimum. The lower amounts will obtain higher density products as will be apparent.

Also effective in promoting the formation of lightweight cementitious products according to the invention in addition to anionic surface active agents are agents which may be grouped under the heading of colloidal dispersions and include silica sol and resin lattices such as polyvinyl resins e.g. polyvinyl acetate. Preferred resins are vinyl-acrylic resins.

The asbestos fibers used are chrysotile asbestos fibers. Any given source of chrysotile fiber yields fibers of various lengths. First, hand-cobbing produces No. 1 and No. 2 grades of Crude of as much as 1 inch or even 2 inches in length. The remainder yields fibers classified according to length into various grades (standard grades). In the process of the present invention, it is preferred to use fibers designated as 6D fibers or longer, e.g. 5R, 4T, 4K and 3K. No. 1 and No. 2 crudes can be used but are highly uneconomical. The fiber designations referred to are according to the well known Quebec Standard Test Method.

There should be used a minimum amount of fiber of about 0.8–1.6 parts per 100 parts water. The minimum amount of 0.8 parts fibers is more suitable for spinning grade fibers while the minimum amount of 1.6 parts fiber is indicated for medium length grade fiber. The upper limits of fiber to water are controlled for a well opened fiber by high viscosities and attendant difficulty of handling. Preferably the upper limits are from about 2.5 to about 5 parts of fiber per 100 parts water, it being desirable to keep the upper limit to 2.5 parts or less for spinning grade fibers, and to 5.0 parts or less for medium length fibers.

The curing can take place at low temperature or higher. Higher temperatures will result in shorter curing times. While some shrinkage in the foamed product ordinarily occurs at room temperature during drying, such shrinkage is reduced at higher temperatures. Setting can take place in as little as 6 hours at 150°F. compared with from 2 to 3 days at 80°F. in otherwise comparable experiments. For maximum strengths in the latter it is preferable that longer curing times be given which is common to normal Portland Cement practice.

The product of the invention shows densities as little as 3 lbs/ft$^3$ to as high as 35 lbs/ft$^3$.

The water employed is ordinary industrial water and no special treatment is required nor is it required that the water hardness be below a certain value. Water temperature should be between 70° and 90°F., and preferably about 80°F.

The products of the invention having a density in the lower range i.e. about 3 lbs/ft$^3$ may contain a minimum of 10–20 parts fiber, preferably 30–40 parts per 100 parts cementitious material. This amount is lower in products having a density in the upper range and may amount to as little as 2.25–4.5 parts fiber, and preferably 3–6 parts per 100 parts cementitious material depending on the length of the fiber.

The invention will now be described in greater detail in the following non-limiting examples. For ease of reference, Chrysotile Asbestos will simply be referred to as asbestos and the word "Grade" will not be repeated unless necessary.

EXAMPLES TO ILLUSTRATE THE USE OF
SEQUESTERING AGENTS

EXAMPLE 1

A. Water (6,000 cc) at 80°F. was added to an open vessel of proper capacity equipped with a multi-level electric stirrer. Portland Cement (1,500 grams) was then added, followed by addition of the sequestering agent, sodium hexametaphosphate (30 g.). These ingredients were mixed together at low speed (450 r.p.m.) for a short period (5 minutes). Addition of DUPONOL G (trade mark) (60 g.) and asbestos 5R (300 g.) followed. The mixture was then stirred again at low speed (450 r.p.m.) for a short period e.g. 5 minutes. The mixture was then subjected to vigorous agitation, e.g. 1,200 r.p.m. until a volume of 12,000 cc. was obtained. The time of stirring was 39 minutes and the product was fine celled and of a definite viscous consistency. The viscosity as measured by a Brookfield viscometer, model HBT, using number H–1 spindle was 497 cps. The product was then poured into a wooden mold lined with polyethylene film. After 5 days it had set firm. At 7 days it was removed from the mold and transferred to a humidity cabinet for a further 14 days. It was then dried out in hot air. The time of initial set of five days at ambient temperature could be reduced to a matter of hours by heating the mold in a steam filled atmosphere or if the mold is equipped with a lid to retain the water, in hot air, e.g. 6 hours at 150°F. Shrinkage during curing is also reduced.

The product obtained gave the following test data:

Shrinkage during curing: 19% (based on initial and final thickness measurements: lateral shrinkage small).
Density: 14.3 lbs/ft.$^3$
Flexural strength (modulus of rupture): 101 psi B. To illustrate the use of other anionic surfactants, with sodium hexametaphosphate, Example 1 was repeated using 200 g. Asbestos 5R and 40 g. of one of the following active materials: Ninate 411 (trade mark), Tergitol 7 (trade mark) and Triton 770 (trade mark). A fine celled product of about 12,000 ml volume was obtained. The viscosity of the material, the time of setting, the density and flexural strength were as follows:

|  | Ninate 411 | Tergitol 7 | Triton 770 |
|---|---|---|---|
| Viscosity (cps) | 357 | 416 | 363 |
| Setting time (days) | 10 | 23 | 8 |
| Density (lbs/ft.$^3$) | 15.1 | 19.5 | 12.9 |
| Flexural Strength (p.s.i.) | 88 | 142 | 48 |

EXAMPLE 2

The proportions of the various ingredients used in Example 1 may be altered. In this example the effect of such alterations is shown with the sodium hexametaphosphate being maintained at the same percentage of the weight of the cement, namely 2 percent. The results obtained are shown in Tables 3, 4 and 5.

Referring to Tables 3 and 4 which give comparative data for a 5R and 3K fibers respectively for the same quantity of cement at 1,500 grams, it is clear that the longer 3K fiber gives greater reinforcing action than the shorter 5R fiber, also that less of the former is required to give comparable reinforcement. It is also seen that the longer fiber gives higher viscosities to the aerated cement dispersion and that for comparable mixing facilities to attain aerated cement volume of ±12,000 ml (reference volume), it is essential that less of the 3K be used due to the much greater viscosity developed and its consequent effect on stirring action. Reducing water content has also the effect of increasing viscosity and thereby for the same fiber reinforcement the maximum loading to obtain ±12,000 ml of aerated product is reduced. For example for 5R fiber, 6,000 ml of water enable a fiber loading of 300 grams and 5,000 ml of water permit a loading of 250 grams. The viscosities are comparable. Employing 3K fiber, 6,000 ml of water permit 150 grams and 5,000 ml of water permit 100 grams. The viscosities are again comparable and are similar to those afforded by the 5R fiber.

For realization of maximum strength it is important that the asbestos fiber be well dispersed, that is sufficient "DUPONOL G" (trade mark) be included. The greater the amount of fiber the greater the amount of surfactant that must be included to adequately disperse the fibers.

Thus in the case of 5R fiber, for 6,000 ml of water, 300 grams of 5R require 60 grams of Duponol G (trade mark) to yield an M.R. of 101 psi. Reducing the Duponol G (trade mark) to 40 grams gives only 44 psi. However, using 200 grams of 5R permits an M.R. of 43 psi. for the same amount of Duponol G (trade mark), i.e. 40 grams.

In Table 5 the quantity of Portland Cement has been reduced to 750 g. and for 5R fiber it is apparent that to attain a final aerated cement volume of ±12,000 ml. slightly higher loading of fiber is permitted, e.g., 350 grams VS. 300 grams in Table 3 (for 6,000 ml. water). The minimum fiber requirement is also reduced: 100 grams VS. 150 grams. It is also possible to reduce the amount of water to 4,000 ml and still attain an aerated cement volume of ±12,000 ml.

EXAMPLE 3

To illustrate the preparation of a high expansion material the following example is given:

| Ingredients A: | 6000 ml. Tap Water |
| | 1500 grams Portland Cement |
| | 30 Grams Sodium Hexametaphosphate |
| Ingredients B: | 40 Grams Duponol G (trade mark) |
| | 300 Grams Asbestos 5R |

Employing a similar procedure to Example 1 except that an extra propeller was employed, a product of volume 18,400 ml was obtained after 30 minutes stirring. The material took 9 days to set firm and when fully cured had a density of 9.5 lbs/ft$^3$ and flexural strength of 39 psi.

EXAMPLE 4

A series of experiments were carried out using varying amounts of sequestering agent in an otherwise standard formulation:

| Ingredients A: | 6000 ml. Water |
| | 1500 grams Portland Cement |
| | Sodium Hexametaphosphate |
| Ingredients B: | 50 g. Duponol G (trade mark) |
| | 300 g. Asbestos 5R |

Ingredients A were stirred for 5 minutes at low speed with a propeller stirrer. The balance of the formulation, i.e. Ingredients B, was then added and stirring continued for 6 minutes. High speed stirring was then commenced and aeration to a lesser or greater extent took place. The results obtained for various amounts of sequestering agent are shown in Table 6.

It is to be noted that without any inclusion of sodium hexametaphosphate only very limited aeration took place. The product was somewhat cellular in appearance. By using large amounts of Duponol G (trade mark) and long stirring times it is possible to obtain aeration to a fair degree but this involves impractical and uneconomic conditions.

Using differing amounts of sodium hexametaphosphate the conclusion from Table 6 is that there is an optimum addition, about 2 percent on the weight of cement, which causes more rapid setting of room temperature than using smaller additions of sequestering agent. Using larger amounts though giving a more rapid set leads eventually to a marked fall-off in strength. This is due to the colloidal nature of the chemically dispersed fiber being effected. There is a tendency for fiber clotting to occur. Thus sufficient sequestering agent must be added to sequester the cement ions, but an excess can interfere with the colloidal fiber dispersion.

EXAMPLE 5

In the following examples the role of the sequestering agent and that of the asbestos was defined.

A. Use was made of the following basic formulations:
6,000 ml. water
1,500 g. Portland Cement
50 g. Duponol G (trade mark)
200 g. Asbestos 5R The above ingredients were stirred for 6 minutes at low speed and then for 30 minutes at high speed in similar apparatus as in Example 1. The volume of the mixture remained approximately the same.

However, on addition of 2 percent sodium hexametaphosphate, aeration immediately took place and after 20 minutes the volume of the mixture obtained was 12,000 ml.

B. Replacing Duponol G (trade mark) by 40 g. Alkanol WXN in the above formulation, after gentle slurrying for 15 minutes, the mixture was stirred at high speed for 80 minutes when a volume of only 7,500 ml. was obtained. On addition of 30 grams sodium hexametaphosphate an additional 31 minutes stirring yielded a fined celled product of volume 12,100 ml. This material set firm after 12 days and on full curing had a density of 17.4 lbs./ft.$^3$ and flexural strength 123 psi.

C. Experiment 5A was repeated with the same ingredients, except that no asbestos fiber was used. After stirring at high speed for 10 seconds the volume of the mixture was 12,300 ml. and after 1 minute the volume was 15,500 ml. with a viscosity of 72 cps. However after standing in a mold for 24 hours, the volume had collapsed.

EXAMPLES 6a AND 6b

In the following example, sodium tripolyphosphate and Na salt of N.T.A. were used in lieu of sodium hexametaphosphate as sequestering agent.

The following formulation was used:

| Ingredients A: | 5,500 ml. water |
| --- | --- |
| | 1,500 g. Portland Cement |
| | 30 g. Sodium Tripolyphosphate (2% on wt. of cement) |
| | or  49 g. Sodium salt of N.T.A. |
| Ingredients B: | 40 g. Duponol G (trade mark) |
| | 200 g. Asbestos 5R |

The mixture was processed in the same manner as Example 1.

After an appropriate time stirring, the volume was about 12,000 ml. of viscosity 464 cps and 504 cps respectively. The cured product had the following properties:

| | Na T.P.P. | Na N.T.A. |
| --- | --- | --- |
| Density: | 15.5 lbs/ft³ | 13.3 |
| Flexural strength: | 91 p.s.i. | 34 |

EXAMPLE 7

In the following example, the sodium salt of ethylenediamine tetraacetic acid was used as sequestering agent in varying proportion.

The following basic formulation was used:

| Ingredients A: | 6,000 ml. water |
| --- | --- |
| | 1,500 g. Portland Cement |
| | Sodium Salt of E.D.T.A. |
| Ingredients B: | 40 g. Duponol G (trade mark) |
| | 300 g. Asbestos 5R |

The above ingredients were processed in a similar manner to Example 4, in which the role of sodium hexametaphosphate was examined.

The amounts of sequestering agent and operating proportions as well as product test data are shown in Table 7. The percentage of sequestering agent is expressed as percent E.D.T.A. on weight of cement.

It is to be noted that an excess of E.D.T.A. does not have the deleterious effect on strength as has sodium hexametaphosphate. Also time to set at room temperature is much less. In general it has also been found that cell quality tends to be superior.

EXAMPLE 8

In the following example the effect of differing curing techniques at room temperature is illustrated. It is well known that Portland Cement strength increases with time — 28 days cure — and these examples show that aerated Portland Cement even when containing colloidal asbestos fibers, vis-a-vis surfactants is still capable of giving improved strengths with ageing.

A series of samples of aerated Portland Cement were made to the following basic formulation:

| Ingredients A: | 6,000 ml. water |
| --- | --- |
| | 1,500 g. Portland Cement |
| | 4% sodium salt of E.D.T.A., as E.D.T.A. on weight of cement |
| Ingredients B: | 40 g. Duponol G (trade mark) |
| | 300 g. Asbestos 5R |

The ingredients were mixed and processed in the same manner as in Example 7 and the series of similar samples so produced were exposed to different case schedules at room temperature. Results are summarized in Table 8. Immediately after each particular cure schedule the sample in question was dried out in hot air at 200°F. until constant weight. It will be noted that to obtain optimum strength the sample should have a period of exposure to the atmosphere as well as a period of exposure to a humid atmosphere.

EXAMPLE 9

This example illustrates the partial replacement of Portland Cement by a siliceous material - silica flour.

The following mixture was processed in the same manner as Example 7:

| Ingredients A: | 6,000 ml. tap water |
| --- | --- |
| | 900 g. Portland Cement |
| | 600 g. Silica flour |
| | 4% sodium salt of E.D.T.A., as E.D.T.A. on weight of cement only. |
| Ingredients B: | 40 g. Duponol G (trade mark) |
| | 300 g. Asbestos 5R |

After 30 minutes stirring a volume of 12,100 ml was obtained. The aerated cement-silica containing product was allowed to set in a mold at room temperature for 5 days and was then autoclaved at 100 psi for 20 hours to complete the curing.

The product obtained was considerably harder than the corresponding product without silica flour and appeared to have much superior heat resistance. It had a small size cellular structure of excellent appearance.

It had the following physical properties:

| Density: | 11.9 lbs/ft³ |
| --- | --- |
| Flexural strength: | 143 psi |

It should be particularly noted that a room temperature set is desirable before autoclave curing to avoid tendency to cracking. Alternatively, the temperature of the autoclave is raised slowly over a period of hours which is common to normal lightweight cement practice. Preferably though the temperature-pressure is raised even more slowly, particularly for the low density material such as given in this example.

EXAMPLE 10

This example illustrates the partial replacement of Portland Cement by a naturally occurring Pozzolana - diatomaceous earth.

A. The following basic formulation was used:

| Ingredients A: | 6,000 ml. water |
| --- | --- |
| | 960 g. Portland Cement |
| | 540 Diatomaceous earth |
| | 19 g. sodium hexametaphosphate |
| Ingredients B: | 200 g. Asbestos 5R |
| | 40 g. Duponol G (trade mark) |

The above ingredients were mixed in the same manner as Example 1.

After 48 minutes of high speed stirring 12,000 ml of a fine celled material was obtained of viscosity 912 cps. This product was then cured in low pressure steam at 150°F. and, after 15 hours, the material had set throughout its thickness — 3 inches — continued to 48 hours overall to obtain a more thorough cure. The dried material which showed no shrinkage had the following properties:

| Density: | 9.3 lbs/ft³ |
| --- | --- |
| Flexural strength: | 92 psi |

B. The following formulation was processed in the same manner as in example 10A:

| Ingredients A: | 5,500 ml tap water |
| --- | --- |
| | 480 g. Portland Cement |
| | 270 g. Diatomaceous earth |
| | 9.6 g. sodium hexametaphosphate |
| Ingredients B: | 200 g. Asbestos 5R |
| | 40 g. Duponol G (trade mark) |

After 40 minutes stirring a product was obtained of volume 12,000 ml and viscosity 598 cps. The cured material had a density of 4.9 lbs/ft.$^3$ and flexural strength 27 psi.

C. In a similar experiment the following formulation was processed in the same manner as in Example 10A:

| Ingredients A: | 5,500 ml water |
| --- | --- |
| | 320 g. Portland Cement |
| | 180 g. Diatomaceous earth |
| | 6.4 g. sodium hexametaphosphate |
| Ingredients B: | 200 g. Asbestos 5R |
| | 30 g. Duponol G (trade mark) |

After 37 minutes high speed stirring, a fine celled product of volume 12,000 ml was obtained of viscosity 444 cps. The cured material had a density of 3.8 lbs/ft.$^3$ and flexural strength 11 psi.

As can be seen, the use of diatomaceous earth resulted in very lightweight aerated products.

EXAMPLES TO ILLUSTRATE THE USE OF MISCELLANEOUS STABILIZING AGENTS

EXAMPLE 11

A. In the following example the use of silica sol as a stabilizing agent is illustrated:

| Ingredients A: | 6,000 ml tap water |
| --- | --- |
| | 1,500 g. Portland Cement |
| | 105 g. Duponol G (trade mark) |
| | 300 g. Asbestos 5R |
| Ingredients B: | 10% as solids (SiO$_2$) of silica sol 'Nalcoag 1050' ex Alchem Ltd. |

Ingredients A were stirred for 10 minutes, ingredients B added and slurrying continued for another 5 minutes. After 71 minutes high speed stirring a fine celled product of volume 11,700 ml was obtained. This set quite firm after 2 days and when allowed to cure fully the material had a density of 12.4 lbs/ft.$^3$ and flexural strength 60 psi, shrinkage during curing was negligible.

B. In the following example the use of a water soluble resin lattice as a stabilizing agent is illustrated:

| Ingredients A: | 5,500 ml water |
| --- | --- |
| | 200 g. Asbestos 5R |
| | 40 g. Duponol G (trade mark) |
| Ingredients B: | 150 g. as solids of Vinyl-Acrylic resin latex No. 4280 (National Starch & Chemical Co.) |
| Ingredients C: | 1,500 g. Portland Cement |

Ingredients A were stirred for 6 minutes to disperse the asbestos fibers. The vinyl-acrylic latex was then added and slurrying was continued for another 5 minutes. The cement was then added and the complete mixture was then stirred for a further 4 minutes. High speed stirring was then commenced and after 107 minutes a fine celled product of volume 11,200 ml and 798 cps viscosity was obtained. The material took 8 days to set firm at room temperature and when curing had been completed, it had a density of 21.0 lbs/ft.$^3$ and flexural strength 191 psi.

EXAMPLES TO ILLUSTRATE THE USE OF HARD WATER STABLE ANIONIC SURFACTANTS

EXAMPLE 12

In examples so far given the surface active agents require additional additives to promote any degree of aeration.

It has been found that there are surfactants available, which besides being capable of opening up chrysotile fiber, are hard water stable, and allow aeration to a lesser or greater extent in the presence of Portland Cement.

A. The following illustrates the use of "Duponol D" (trade mark) surface active agent:

| Ingredients A: | 6,000 ml. tap water |
| --- | --- |
| | 200 g. Asbestos 5R |
| | 40 g. Duponol D (trade mark) (as active material) |
| Ingredients B: | 1,500 g. Portland Cement |

Ingredients A were stirred gently for 15 minutes, the balance of the formulation added and the whole stirred for another 5 minutes. On high speed agitation for 25 minutes, a fine celled product of volume 12,000 ml and viscosity 196 cps, was obtained. This set firm after 2 days and on full curing gave a material of density 13.7 lbs/ft.$^3$ and flexural strength 48 psi.

B. Table 9 summarizes results obtained using other surface active agents. The procedures used were similar to Example 12A. In each case the amounts of water, cement, and fiber were the same as in Example 12A.

EXAMPLE 13

It is also possible to produce aerated cement according to this invention using a combination of anionic surfactants. In particular one surfactant is capable of chemically opening asbestos fiber but has limited degree of foaminess in hard water, e.g. Duponol G (trade mark). The other surfactant (or surfactants) has good foaming properties in hard water. It is not necessary that it be capable of chemically opening asbestos.

A. To illustrate, the following example is given:

| Ingredients A: | 6,000 ml tap water |
| --- | --- |
| | 200 g. Asbestos 5R |
| | 20 g. Duponol G (trade mark) |
| | 20 g. Cedepal SS-406 (trade mark) (as active material) |
| Ingredients B: | 1,500 g. Portland Cement |

This was processed in an identical manner to Example 12A. After 14 minutes of high speed agitation a fine celled material of volume 12,200 ml and viscosity 217 cps was obtained. This set firm after 4 days and when fully cured had a density of 13.6 lbs/ft.$^3$ and flexural strength 50 psi.

In a similar experiment the "Duponol G" (trade mark) was deleted and replaced by another 20 g. "Cedepal SS-406" (trade mark). After one minute high speed agitation a volume of 13,300 ml was obtained and the viscosity was 90 cps. The foamed product had the appearance of soap bubbles and was obviously of no value.

B. Table 10 summarizes results obtained using other anionic surfactants with "Duponol G" (trade mark). The amounts of Duponol G (trade mark), water, fiber, cement were identical to Example 13A.

EXAMPLES TO ILLUSTRATE THE COMBINATION OF HARD WATER STABLE AMPHOTERIC SURFACTANTS AND ANIONIC SURFACTANTS

It has been found possible to promote aeration of chemically opened asbestos which has limited foaminess in hard water, by the addition of amphoteric surface active agents. To illustrate, the following examples are given.

EXAMPLE 14

A. Ingredients A: 6,000 ml tap water
200 g. Asbestos 5R
20 g. Duponol G
(trade mark)
20 g. Miranol C2M-TEA (trade mark) (as active material)
Ingredients B: 1,500 g. Portland Cement This was processed in a manner similar to Example 12A. After 37 minutes of high speed agitation a fine celled mixture of volume 12,000 ml and viscosity 245 cps was obtained. This set firm in 4 days and after full curing had a density of 14.5 lbs/ft.$^3$ and flexural strength 73 psi.

B. Ingredients A: 6,000 ml tap water
200 g. Asbestos 5R
20 g. Duponol G
(trade mark)
20 g. Product BCO (trade mark)
(as active material)
Ingredients B: 1,500 g. Portland Cement Processing in a similar manner to the above gave 12,600 ml of mixture of viscosity 261 cps after 40 minutes high speed agitation. This set firm at 5 days and after full curing had a density of 12.9 lbs/ft.$^3$ and flexural strength 61 psi.

EXAMPLES TO ILLUSTRATE THE COMBINATION OF NONIONIC SURFACTANTS AND ANIONIC SURFACTANTS

It has been found possible to promote aeration of chemically opened asbestos which has limited foaminess in hard water, by the addition of nonionic surfactants. The latter must be of the type which will foam in water and also be resistant to Portland Cement.

EXAMPLE 15

A. To illustrate the combination of nonionic and anionic surfactants the following example is given:

Ingredients A: 6,000 ml tap water
200 g. Asbestos 5R
20 g. Duponol G
(trade mark)
20 g. Alrosol C
(trade mark)
Ingredients B: 1,500 g. Portland Cement This was processed in a manner similar to Example 12A. After 30 minutes high speed agitation a fine celled product of volume 12,700 ml and viscosity 317 cps was obtained which set firm at 3 days. When fully cured it showed a density of 12.8 lbs/ft.$^3$ and flexural strength 45 psi.

B. In an otherwise identical formulation the amount of Duponol G (trade mark) was increased to 40 grams. After 33 minutes high speed agitation a volume of 12,300 ml was obtained of viscosity 334 cps. This mixture took 4 days to set firm and the fully cured product had a density of 13.4 lbs/ft.$^3$ and flexural strength 73 psi.

C. The following example illustrates the production of aerated asbestos Portland Cement on a large scale, employing a combination of Alrosol C/ Duponol G (trade mark) surface active agents. In this particular example only one propellor speed — 1,100 rpm — was employed.

Ingredients A: 180 liters tap water
100 lbs Portland Cement
Ingredients B: 1,200 grams Duponol G
(trade mark)
13.3 lbs Asbestos 5R
Ingredients C: 600 g. Alrosol C
(trade mark)

In a scaled-up version of the tank-mixing assembly hitherto-fore described, were placed Ingredients A, which were agitated at high speed for 3 minutes. Ingredients B were then added and high speed agitation continued for a further hour. The volume of material at this time was 245 liters showing that a limited degree of aeration had taken place. The mixture was of viscous consistency indicating that chemical opening of fiber had occurred even though air had been introduced into the system. The "Alrosol C" was next added and after a further 30 minutes stirring a fine celled product of volume 362 liters was obtained. The viscosity measured 472 cps. This was poured in suitable size molds and set quite firm at 4 days. The fully cured material had density of 12.9 lbs/ft.$^3$ and flexural strength 86 psi.

D. Combinations of more than one anionic and nonionic surfactants may be employed, and to illustrate, the following example is given:

Ingredients A: 6,000 ml tap water
200 g. Asbestos 5R
10 g. Duponol G
(trade mark)
10 g. Alkanal 189-S
(trade mark)
20 g. Alrosol C
(trade mark)

Processing in a manner similar to 12A gave after 55 minutes of high speed stirring a fine celled material of volume 12,200 ml and viscosity 327 cps. This set firm at 5 days and the fully cured product had a density of 15.2 lbs/ft.$^3$ and flexural strength 92 psi.

EXAMPLE 16

Table 11 summarizes findings for a number of combinations of anionic and nonionic surface active agents. In all these examples the water/cement/asbestos fiber was 6,000 ml tap water/1,500 g. Portland Cement/200 g. asbestos 5R.

Accelerated Curing of Aerated Portland Cement

In examples so far given, the time to set firm of aerated Portland Cement materials have varied from about 2 days and up, for products cured at room temperature. By increasing curing temperature this time may be drastically reduced.

It has been found that the types of accelerator used in normal Portland Cement practice to reduce the setting time at room temperature may also be employed for the material of this invention.

Some examples to illustrate are given.

EXAMPLE 17

Calcium Chloride

Ingredients A: 6,000 ml tap water
200 g. Asbestos 5R
20 g. Duponol G
(trade mark)
20 g. Alrosol C
(trade mark)
Ingredients B: 30 g. Calcium Chloride
Ingredients C: 1,500 g. Portland Cement Ingredients A were slurried gently for 15 minutes, then Ingredients B were added and slurrying continued for another minute, followed by Ingredients C and slurrying for a further 5 minutes. On high speed stirring, a fine celled material was obtained of volume 12,700 ml. after 57 minutes, of viscosity 334 cps. By 24 hours this had set firm and on full curing had a density of 12.7 lbs/ft$^3$, and flexural strength of 52 psi.

EXAMPLE 18

High Alumina Cement

A. Ingredients A: 6000 ml tap water
200 g. Asbestos 5R
20 g. Duponol G
(trade mark)
20 g. Alrosol C
(trade mark)

Ingredients B: 300 g. Ciment Fondu
1200 g. Portland Cement

Ingredients A were slurried gently for 15 minutes following which Ingredients B were added and slurrying continued for another 2 minutes. After 30 minutes high speed stirring, a fine celled material of volume 12,200 ml and viscosity, 325 cps was obtained. This showed a fair degree of set after only 2 hours when it could be cut with a knife. At the end of 24 hours it was quite firm. After full cure the material had a density of 12.0 lbs/ft.$^3$ and flexural strength of 40 psi.

Compared to a similar formulation containing no Ciment Fondu there is a slight fall off in strength but advantages include more rapid set and reduced shrinkage — 3 percent versus 15 percent. In addition the inclusion of Ciment Fondu imparts a much finer cell structure. In an otherwise comparable experiment in which no Ciment Fondu was included — Example 15A — the average cell diameter was about 0.025 inch. For the Ciment Fondu containing product the cell size was about 0.005 inch. This reduction in cell size may be associated with the much faster set. In general it has been observed that the longer aerated cement takes to set, the larger the cell size. Heat can increase the speed of setting but the natural tendency of heat is to expand the entrained air in the cells and lead to some cell wall breakdown or in effect cause larger cell size. Where heat is used to cure aerated cement produced according to my invention the temperature time increment must be done carefully. High Alumina Ciment may be employed with advantage in heat curing, the preferred embodiment being to obtain an initial set at room temperature before application of heat — about 3 hours has been found to yield good results.

In this way also the inclusion of such cement enables the retention of a fine cell structure in the finished product.

B. The following example illustrates the use of Ciment Fondu at a reduced proportion of the cementitious component compared to the previous example. It also illustrates that by employing different formulation techniques a relatively high cementitious material to water ratio may be aerated successfully. This compares to Examples 2-17 where the expansion factor was limited.

Ingredients A: 4,000 ml tap water
200 g. Asbestos 5R
10 g. Duponol G
(trade mark)
10 g. Sulframin 40 (trade mark)
(as active material)
20 g. Alrosol C
(trade mark)
Ingredients B: 1,400 g. Portland Cement
100 g. Ciment Fondu Employing a similar technique as Example 18A a product of volume 11,900 ml and viscosity 627 cps was obtained after 65 minutes stirring. This set firm after 1 day and a half and had a shrinkage in curing of 7 percent. The fully cured material had a density of 12.8 lbs/ft.$^3$ and flexural strength of 36 psi.

Mould Design

In examples so far cited, non-porous molds have been employed to produce flat sheet material for the object of physical testing. Molds of different design may of course be used and articles of varying shape be produced. In particular cylindrical and semi-circular section material may be made, the latter being of utility for pipe insulation. To achieve accurate reproduction of mold design, formulations of quick setting characteristics are preferred including those based on silica sol, calcium chloride and high alumina cement additives.

In the production of flat sheet material porous molds may be employed which have sufficient porosity to allow the migration of water under gravity. Molds of such design in general allow greater shrinkage in the final aerated product. As an example, using an identical formulation to Example 15A, 12,000 ml of aerated cement were poured into a flat mold, the base of which was made of wire screen covered with absorbent paper.

The material when set was allowed to fully cure and this had a density of 16.8 lbs/ft.$^3$ and flexural strength of 97 psi. Shrinkage in curing was 49 percent. The corresponding figures for Examples 15A were 12.8 lbs/ft$^3$; 45 psi and 15 percent.

FURTHER EXAMPLES TO ILLUSTRATE AERATED CEMENTITIOUS PRODUCTS

EXAMPLE 19

This example illustrates the use of Quicklime instead of Portland Cement.

Ingredients A: 6,000 ml tap water
600 g. Quicklime
Ingredients B: 900 g. Diatomaceous earth
4% of sodium salt of EDTA as EDTA on weight of Quicklime
Ingredients C: 40 g. Duponol G
(trade mark)
200 g. Asbestos 5R The Quicklime was soaked in the tap water and after the reaction had subsided Ingredients A were brought back to a temperature of 80°F. Ingredients B were then added and the whole stirred for 5 minutes, when the balance, Ingredients C, was added and slurrying continued for another 6 minutes. After 40 minutes high speed agitation a volume of 11,800 ml was obtained. This was dried in a porous mold and then autoclaved to give a material of density 15.6 lbs/ft.$^3$ and 121 psi flexural strength.

EXAMPLE 20

Ingredients A: 6,000 ml tap water
200 g. Asbestos 5R
40 g. Duponol G
(trade mark)
40 g. Alrosol C
(trade mark)
Ingredients B: 960 g. Quicklime
540 g. Diatomaceous earth This was processed in a manner similar to Example 15A and after 65 minutes a volume of 12,500 ml was obtained of viscosity 875 cps. The fine celled material was cured in conditions to simulate low pressure steam curing. The cured material had a density of 8.7 lbs/ft.$^3$ and flexural strength of 38 psi.

EXAMPLE 21

This experiment was similar to Example 15A except the normal Portland Cement in the latter was replaced by No. 3 Portland Cement. After 40 minutes stirring a fine celled material of volume 12,300 ml and viscosity 400 cps was obtained. This set firm in 3 days and the fully cured material had a density of 12.7 lbs/ft.$^3$ and flexural strength of 59 psi.

EXAMPLE 22

In an experiment similar to Example 15A, the normal Portland Cement of the latter was replaced by a High Alumina Cement, Ciment Fondu. After 8 minutes high speed agitation 12,200 ml of fine celled material was obtained of viscosity 192 cps. This set firm at 2 days and the dried material had density of 14.0 lbs/ft.$^3$ and flexural strength 11 psi.

Non-aerated lightweight cementitious products

It is clear in examples cited so far that varying degrees of aeration may be obtained according to this invention. It is clear also that an experiment could be terminated after gentle slurrying only to obtain a dispersion of chemically opened asbestos and cementitious material. The resulting material could be left to set at ambient temperature or be heat cured. To illustrate a preferred embodiment, the following example is given.

EXAMPLE 23

| Ingredients A: | 12,000 ml tap water |
| --- | --- |
| | 200 g. Asbestos 5R |
| | 40 g. Duponol G |
| | (trade mark) |
| Ingredients B: | 480 g. Portland Cement |
| | 270 g. Diatomaceous earth |

Ingredients A were dispersed using a mono pump in closed circulation. After fifteen minutes a gelatinous dispersion of fibers was obtained. No air was present in the mixture. Ingredients B were then added and pumping continued for another 5 minutes. The smooth gelatinous dispersion of asbestos and cementitious material of viscosity 152 cps, was then poured into a mold and cured under conditions to simulate low pressure steam curing. The cured material had density of 6.3 lbs/ft.³ and flexural strength of 20 psi. In contrast to the aerated cementitious products the structure consisted of fine capilliaries. It was not cellular in appearance.

Viscosity of colloidal asbestos dispersions

To illustrate more succinctly the interrelation between viscosity and asbestos fiber length the following example is given.

EXAMPLE 24

Employing a slow speed stirrer, colloidal dispersions were prepared from chrysotile asbestos fibers using the following formula:

3,000 ml tap water
100 g. Asbestos fiber
20 g. Dioctylester of sodium sulfosuccinic acid (Aerosol OT) (trade mark) (as active material)

A range of asbestos fibers was evaluated for viscosity after 1 hour stirring, using Brookfield syncrolectric viscometer model No. HBT, No. 1 spindle.

Table 12 summarizes results obtained:

TABLE 12

| Fiber Grade | Viscosity Reading—CPS |
| --- | --- |
| 3F | 687 |
| 3K | 648 |
| 3R | 630 |
| 3T | 565 |
| 3Z | 488 |
| 4D | 406 |
| 4T | 406 |
| 5D | 304 |
| 5R | 232 |
| 6D | 165 |

It is clear that as fiber length increases (in terms of the Quebec Standard Test) so also does viscosity. The fibers referred to in the example were all obtained from the same mine in the Thetford Mines region, Province of Quebec. Similar type results may be obtained for other chrysotile mine sources. These may vary because of different mine source, but the interrelation between length and viscosity is still evident. Viscosity is also dependent on fiber concentration. It also seems to be different on fiber "harshness" — the ability of a fiber to be fiberized by physical methods. Thus for different mine sources fibers of similar length can give differing viscosities due perhaps to their differing ability to be chemically opened: Put in semi-quantitative terms:

$$\frac{\text{Viscosity}}{\text{Concn.}} = \text{function} \left[\frac{\text{length}}{\text{diameter}}\right]_n$$

For solutions of polymers, viscosity is related to degree of polymerization (DP) by the well known formula:

$$\nu/\text{Concn.} = \text{constant } DP$$

where $a$ = a constant dependent on configuration of the polymer chain. Asbestos fibers may be regarded as inorganic polymers and it is clear therefore that for colloidal systems of these fibers it is to be expected that viscosities of such systems should give an indication of degree of polymerization of the fiber or in other terms the average length of the fibers. Solvation also has an effect on viscosities — interaction between polymer molecule and solvent. Thus the amount of water which is picked up by the chemically opened asbestos to act kinetically as part of the fiber can influence viscosity.

Aerosol OT is an extremely active anionic surfactant for opening up asbestos fibers and provides higher viscosity readings than obtained by many other surface active agents. Employing say Duponol G (trade mark) will give a similar set of readings as in Table 12 but the values are proportionally less.

In terms of reinforcing action the finer the fibers the greater the reinforcement, or, the higher the viscosity obtained the greater the degree of reinforcement or say, the higher the flexural strength.

Flexural strength of the asbestos cementitious system also depends on the material density:

Quantitatively:

Taking flexural strength $\alpha$ density$^2$
and flexural strength $\alpha$ [L/D] × amount of fiber
but viscosity $\alpha$ function [L/D] × amount of fiber i.e. $\frac{\text{flexural strength}}{\text{density}^2}$ $\alpha$ function of viscosity A graphical plot of the above for aerated cementitious systems (1,500 g. cement/6,000 ml water) has shown a very rough correlation. In addition a low viscosity (140 cps or less) can also instead of or as well indicate a material of poor cell quality — i.e. large cells with cell wall breakdown. Material of small size even though it may have a relatively low strength does not seem to be associated with very low viscosities.

Viscosity for an aerated system has also been found to be dependent to a certain degree on the expansion factor. Thus in a typical formulation employing 1,500 g. cement/6,000 ml water/200 g. 5R asbestos and employing Duponol G/Alrosol C surface active agents (trade marks), viscosity was measured during the process of high speed agitation as follows:

| Stirring time (min) | Volume of mix (ml) | Viscosity—CPS |
| --- | --- | --- |
| 5 | 9100 | 303 |
| 15 | 11500 | 330 |
| 25 | 13300 | 360 |
| 60 | 17100 | 450 |
| 75 | 18100 | 484 |

Additional fiber reinforcement

The inclusion of chemically opened asbestos fiber is essential to the invention to promote stable aerated systems. This also applies to non-aerated material and prevents migration of water or in effect settling of the fibers and cement in curing. The asbestos fibers by virtue of their high intrinsic strength and high aspect ratio impart considerable reinforcing action. It is clear, however, that other fibrous materials may be incorporated to obtain additional reinforcing action. Such fibers may be organic or inorganic and can include: cellulose, polypropylene, nylon, silica, glass. It is clear also that steel reinforcement may be used, particularly in the form of steel mesh as is used in concrete construction.

Additional properties of a lightweight asbestos containing cementitious product

Properties other than density and flexural strength are given below for a specific embodiment of the invention — Example 2-3.

| | |
|---|---|
| K Factor, Btu/hr. sq. ft. °F./in. | |
| Dry—Mean Temp. 75°F. | 0.39 |
| 200°F. | 0.43 |
| 400°F. | 0.49 |
| Maximum Use Temp. °F. | est. 800–1000°F. |
| Compression Strength, psi | |
| 50% RH–72°F. at 15% Deflection | 31 |
| 25% Deflection | 38 |
| 50% Deflection | 65 |
| % Recovery +After 15% Deflection | 93 |
| 50% Deflection | 60 |
| Water Resistance | |
| Absorption After 24 hr. Immersion | |
| % by weight | 150 |
| % by volume | 135 |
| Compression Str., psi at 15% Deflection Wet, After 24 hr. Immersion | 24 |
| % Recovery + After Redried and Conditioned at 50% RH–72°F. | 93 |
| at % Recovery + | 47 |
| | 93 |
| Moisture Absorption | |
| at 50% RH–72°F.—% by weight | 4.4 |
| % by volume | 0.94 |
| at 100% RH–72°F.—% by weight | 21 |
| % by volume | 4.5 |
| Tensile Strength Perpendicular to Surface, psi | 5.4 |
| Flame Resistance—Effect of Exposure to 1200°F. Gas Flame | No apparent Effect |

+Percent of original thickness recovered after deflection indicated, measured after 10 minutes at no load.

TABLE 1

| Surface active agent Trademark | Class | Active ingredient | Type | Supplier |
|---|---|---|---|---|
| Alkanol 189-S | Alkyl sulfonates | Sodium alkyl sulfonate | Anionic | DuPont. |
| Sarkosyl NL-97 | Sarcosine derivatives | Sodium lauroyl sarcosinate | do | Geigy. |
| Ultraphos 21-A | Phosphate derivatives | Complex organic phosphate ester | do | Witco. |
| Duponol G | Alcohol sulfates | Fatty alcohol amine sulfates | do | DuPont. |
| Duponol Wat | do | Triethanolamine salt of sulfated higher alcohol mixture. | do | Do. |
| Duponol EP | do | Diethanolamine lauryl sulfate | do | Do. |
| Tergitol 7 | do | Sodium heptadecyl sulfate | do | Union Carbide. |
| Tergitol 4 | do | Sodium tetradecyl sulfate | do | Do. |
| Duponol D | do | Sodium lauryl sulfate | do | DuPont. |
| Duponol RA | Ethoxylated alcohol sulfates of ethoxylated alcohol. | Fortified alkoxy alkyl sodium sulfate | do | Do. |
| Nekal BX-78 | Sulfonates of napthalene | Sodium alkyl napthalene sulfonate | do | General Aniline & Film. |
| Neutronyx S-60 | Sulfated ethoxylated alkyl phenols | Ammonium salt of a sulfated alkyl phenol polyglycol ether. | do | Onyx. |
| Triton 770 | do | Sodium alkyl aryl ether sulfate | do | Rohm & Haas. |
| Sulframin 40 | Dodecyl and tridecyl benzene sulfonated | Sodium linear alkylate sulfonate | do | Witco. |
| Ultrawet K | do | do | do | Arco. |
| Ninate 411 | do | Amine alkyl aryl sulfonate | do | Stepan. |
| Arctic Syntex M | do | Linear alkyl benzene sulfonate | do | Colgate-Palmolive. |
| Alkanol WXN | do | Sodium alkyl aryl sulfonate | do | DuPont. |
| Atlas G-711 | do | Alkyl aryl sulfonate | do | Atlas. |
| Igepon TK-32 | Taurates | Sodium N-methyl-N-tall oil acid taurate | do | General Aniline & Film. |
| Igepon TN-74 | do | Sodium N-methyl-N-palmitoyl taurate | do | Do. |

TABLE 2

| Surface active agent trademark | Class | Active ingredient | Type | Supplier |
|---|---|---|---|---|
| Alrosol C | Alkanolamides | Fatty alkylol amide condensate | Nonionic | Geigy. |
| Cedemide C | do | Coconut fatty acid diethanolamide | do | Chemical Devs. of Canada. |
| Cedemide D | do | do | do | Do. |
| Ninol 201 | do | Oleic acid alkanolamide | do | Stepan. |
| Super-Amide L-9 | do | High activity lauric acid dethanolamine condensate | do | Onyx. |
| Super-Amide GR | do | High activity refined coconut fatty acid diethanolamine condensate. | do | Do. |
| Onyxol 42 | do | Stearic acid diethanolamine condensate | do | Do. |
| Onyxol 345 | do | Lauric acid diethanolamine condensate | do | Do. |
| Product BCO | Betaine derivatives | C-cetyl betaine | Amphoteric | DuPont. |
| Dowfax 2A-1 | Diphenyl sulfonate derivatives | Sodium dodecyl diphenyl ether disulfonate | Anionic | Dow. |
| Plurafac A-24 | Ethoxylated alcohols | Oxyethylated straight chain alcohol | Nonionic | Wyandotte. |
| Tergitol 15-S-12 | do | Polyethylene glycol ether of linear alcohol | do | Union Carbide. |
| Cedepal SS-406 | do | Sodium salt of sulfated ethoxylate of primary linear alcohol. | Anionic | Chemical Devs. of Canada. |
| Neutronyx 600 | Ethoxyated alkyl phenols | Alkyl phenol polyglycol ether CTG, 9.5 moles ethylene oxide. | Nonionic | Onyx. |
| Triton X-100 | Phenols | Isooctyl phenoxy polyethoxy ethanol | do | Rohm & Haas. |
| Renex 648 | do | Ethoxylated nonyl phenols | do | Atlas. |
| Amidox C-2 | Ethoxylated amines, amides | Ethoxylated alkylolamide | do | Stepan. |
| Amidox L-2 | do | do | do | Do. |
| Ethofat C-25 | Ethoxylated fatty acids | Ethylene oxide condensate of a fatty acid | do | Armour. |
| Glycosperse TO-20 | Ethoxylated fatty esters and oils | Ethoxylated trioleate | do | Glyco. |
| Nonisol 200 | Glycol esters | Polyethylene glycol ester of oleic acid | do | Geigy. |
| Nonisol 210 | do | do | do | Do. |
| Miranol C2M-TEA | Imidazoline type products | Dicarboxylic coconut derivative triethanolamine salt. | Amphoteric | Miranol. |
| Chemactant S-16 | Lanolin based derivatives | Ethoxylated lanolin alcohols | Nonionic | Chemactants. |
| Atlas G-1795 | do | Polyoxyethylene lanolin derivatives | do | Atlas. |
| Atlas G-1295 | Monoglycerides and derivatives | Polyoxyethylene fatty glyceride | do | Do. |
| Armotan PML-20 | Sorbitan derivatives | Polyoxyethylene sobitan monolaurate | do | Armour. |
| Stepanol T-28 | Alcohol sulfates | Sodium lauryl sulfate | Anionic | Stepan. |
| Duponol LS | do | Sodium oleyl sulfate | do | DuPont. |
| Duponol ST | do | Triethanolamine decyl/lauryl sulfate | do | Do. |

TABLE 3

| Example | Water (ml.) | DuPonol G (g.) | 5R (g.) | Stirring time (mins.) | Volume (ml.) | Viscosity (cps.) | Days to set firm | Density (lbs./ft.³) | Flexural strength (p.s.i.) |
|---|---|---|---|---|---|---|---|---|---|
| 2-1 | 6,000 | 70 | 300 | 30 | 12,100 | 525 | 19 | 17.5 | 141 |
| 2-2 | 6,000 | 60 | 300 | 39 | 12,000 | 497 | 5 | 14.3 | 101 |
| 2-3 | 6,000 | 50 | 300 | 26 | 12,000 | 415 | 5 | 14.0 | 64 |
| 2-4 | 6,000 | 40 | 300 | 40 | 12,100 | 250 | 5 | 12.7 | 44 |
| 2-5 | 6,000 | 30 | 300 | 45 | 12,000 | | 5 | 14.0 | 30 |
| 2-6 | 6,000 | 60 | 200 | 32 | 12,300 | 309 | 6 | 13.9 | 73 |
| 2-7 | 6,000 | 50 | 200 | 31 | 12,200 | 291 | 6 | 13.4 | 51 |
| 2-8 | 6,000 | 40 | 200 | 43 | 12,000 | 288 | 5 | 13.7 | 43 |
| 2-9 | 6,000 | 40 | 150 | 47 | 12,100 | 255 | 5 | 13.6 | 34 |
| 2-10 | 6,000 | 30 | 150 | 28 | 9,300 | 175 | | | |
| 2-11 | 6,000 | 40 | 100 | 41 | 10,000 | 209 | 16 | 16.0 | 30 |
| 2-12 | 5,000 | 60 | 300 | 60 | 11,400 | 628 | 5 | 15.7 | 107 |
| 2-13 | 5,000 | 40 | 300 | 53 | 11,800 | | 4 | 13.2 | 71 |
| 2-14 | 5,000 | 50 | 250 | 36 | 12,000 | 470 | 4 | 13.1 | 62 |
| 2-15 | 5,000 | 40 | 250 | 43 | 11,100 | 280 | 8 | 17.6 | 146 |
| 2-16 | 5,000 | 40 | 150 | 36 | 12,100 | 315 | 6 | 13.7 | 36 |
| 2-17 | 5,000 | 30 | 150 | 25 | 7,300 | 252 | | | |
| 2-18 | 5,000 | 40 | 100 | 60 | 9,700 | 272 | | | |
| 2-19 | 4,000 | 40 | 200 | 28 | 7,300 | 430 | | | |

TABLE 4

| Example | Water (ml.) | Duponol G (g.) | 3K (g.) | Stirring time (mins.) | Volume (ml.) | Viscosity (cps.) | Days to set firm | Density (lbs./ft.³) | Flexural strength (p.s.i.) |
|---|---|---|---|---|---|---|---|---|---|
| 2-22 | 6,000 | 60 | 150 | 60 | 11,800 | 515 | 6 | 13.0 | 137 |
| 2-23 | 6,000 | 50 | 150 | 50 | 11,600 | 395 | 6 | 14.0 | 66 |
| 2-24 | 6,000 | 40 | 150 | 40 | 10,400 | 390 | 7 | 16.1 | 70 |
| 2-25 | 6,000 | 60 | 100 | 60 | 12,000 | 290 | 6 | 12.6 | 77 |
| 2-26 | 6,000 | 40 | 100 | 40 | 12,000 | 261 | 5 | 14.1 | 30 |
| 2-27 | 6,000 | 40 | 75 | 38 | 12,100 | 264 | 4 | 13.9 | 36 |
| 2-28 | 6,000 | 30 | 75 | 28 | 12,200 | 263 | 7 | 12.6 | 46 |
| 2-29 | 6,000 | 20 | 75 | 50 | 8,200 | 190 | | | |
| 2-30 | 6,000 | 40 | 50 | 60 | 11,400 | 185 | 5 | 12.6 | 45 |
| 2-31 | 5,000 | 60 | 150 | 60 | 9,800 | 662 | | | |
| 2-32 | 5,000 | 50 | 100 | 40 | 12,100 | 410 | 5 | 14.1 | 59 |
| 2-33 | 5,000 | 40 | 100 | 50 | 11,500 | 267 | 6 | 18.2 | 48 |
| 2-34 | 5,000 | 50 | 75 | 65 | 11,600 | 335 | 5 | 14.1 | 59 |
| 2-35 | 5,000 | 40 | 50 | 34 | 11,600 | 256 | 6 | 17.3 | 25 |

TABLE 5

| Example | Water (ml.) | Duponol G (g.) | 5R (g.) | Stirring time (mins.) | Volume (ml.) | Viscosity (cps.) | Days to set firm | Density (lbs./ft.³) | Flexural strength (p.s.i.) |
|---|---|---|---|---|---|---|---|---|---|
| 2-36 | 6,000 | 70 | 350 | 55 | 12,000 | 464 | 19 | 11.6 | 67 |
| 2-37 | 6,000 | 40 | 100 | 23 | 12,200 | 99 | 11 | 8.7 | 7 |
| 2-38 | 5,000 | 60 | 300 | 55 | 11,700 | 488 | 9 | 12.1 | |
| 2-39 | 5,000 | 40 | 100 | 34 | 12,200 | 208 | 11 | | |
| 2-40 | 4,000 | 40 | 200 | 60 | 12,100 | 447 | 6 | 9.2 | 30 |
| 2-41 | 4,000 | 40 | 150 | 47 | 12,800 | 367 | 7 | 10.0 | 36 |
| 2-42 | 4,000 | 40 | 100 | 30 | 12,100 | 193 | 12 | 20.7 | |

TABLE 6

| Ex. | Sodium hexametaphosphate ᵃ | Stirring time (mins.) | Volume of foamed product (ml.) | Days to set firm | Density (lbs./ft.³) | Flexural strength (p.s.i.) |
|---|---|---|---|---|---|---|
| 4-A | 0 | 120 | 7,500 | 3 | 19.6 | 94 |
| 4-B | 0.2 | 33 | 9,700 | 8 | 15.6 | 97 |
| 4-C | 0.5 | 26 | 12,200 | 8 | | |
| 4-D | 1.0 | 20 | 12,000 | 8 | 13.2 | 43 |
| 4-E | 2.0 | 17 | 12,200 | 5 | 12.8 | 47 |
| 4-F | 3.0 | ᵇ 30 | 12,000 | 4 | 12.2 | 54 |
| 4-G | 4.0 | 21 | 12,200 | 4 | 12.9 | 20 |
| 4-H | 5.0 | 4 | 13,200 | 4 | 14.0 | 8 |

ᵃ Percent by weight of cement.
ᵇ Stirring by one propeller only to 10 minutes, then two propellors as for other examples.

TABLE 7

| Example | Percent E.D.T.A. | Stirring time (mins.) | Volume (ml.) | Days to set firm | Density (lbs./ft.³) | Flexural strength (p.s.i.) |
|---|---|---|---|---|---|---|
| 7-A | 0.5 | 23 | 8,500 | 5 | 18.2 | 102 |
| 7-B | 1.0 | 38 | 10,800 | 5 | 14.3 | 77 |
| 7-C | 2.0 | 40 | 12,000 | 3 | 13.1 | 76 |
| 7-D | 3.0 | 35 | 12,400 | 2 | 12.6 | 59 |
| 7-E | 4.0 | 35 | 12,400 | 2 | 12.8 | 59 |
| 7-F | 5.0 | 39 | 12,000 | 2 | 13.1 | 61 |

TABLE 8

| Ex. | Stirring time (mins.) | Volume (ml.) | Cure schedule Days to atmosphere | Cure schedule Days in humidity cabinet | Density (lbs./ft.³) | Flexural strength (p.s.i.) |
|---|---|---|---|---|---|---|
| 8-A | 35 | 12,300 | 2 | 0 | 13.9 | 40 |
| 8-B | 35 | 12,300 | 4 | 0 | 12.3 | 40 |
| 8-C | 35 | 12,500 | 7 | 0 | 12.6 | 39 |
| 8-D | 35 | 12,500 | 14 | 0 | 13.0 | 54 |
| 8-E | 35 | 12,500 | 28 | 0 | 13.0 | 51 |
| 8-F | 35 | 12,200 | 0 | 14 | 12.5 | 49 |
| 8-G | 35 | 12,200 | 0 | 28 | 12.4 | 49 |
| 8-H | 35 | 12,600 | 2 | 14 | 12.6 | 47 |
| 8-I | 35 | 12,600 | 2 | 28 | | |
| 8-J | 35 | 12,600 | 3 | 14 | 12.6 | 47 |
| 8-K | 35 | 12,400 | 3 | 28 | 12.7 | 60 |
| 8-L | 35 | 12,400 | 5 | 14 | 13.0 | 48 |
| 8-M | 35 | 12,400 | 5 | 28 | 12.5 | 62 |
| 8-N | 35 | 12,500 | 6 | 14 | 12.7 | 59 |
| 8-O | 35 | 12,500 | 6 | 28 | 12.8 | 69 |
| 8-P | 35 | 12,500 | 7 | 14 | 12.8 | 59 |
| 8-Q | 35 | 12,500 | 7 | 28 | 12.9 | 59 |
| 8-R | 35 | 12,500 | 14 | 14 | 12.8 | 62 |
| 8-S | 35 | 12,500 | 14 | 28 | 12.8 | 60 |

TABLE 9

| Example | Surface active agent Name | Amount[a] | Stirring time (mins.) | Volume (ml.) | Viscosity (cps.) | Days to set firm | Density (lbs./ft.³) | Flexural strength (p.s.i.) |
|---|---|---|---|---|---|---|---|---|
| 12-B | DuPonol WAT | 40 | 40 | 12,100 | 240 | 3 | 12.5 | 38 |
| 12-C | DuPonol EP | 40 | 14 | 12,200 | 143 | 2 | 13.1 | 18 |
| 12-D | DuPonol RA | 40 | 18 | 12,300 | 235 | 2 | 13.5 | 48 |
| 12-E | Nekal BX-78 | [b]10 | 4 | 12,800 | 165 | 8 | 11.8 | 7 |
| 12-F | Neutronyx S-60 | 40 | 26 | 12,000 | 242 | 3 | 12.0 | 20 |
| 12-G | Sulframin 40 | 40 | 43 | 12,300 | 120 | 8 | 15.6 | 50 |
| 12-H | Ultrawet K | 40 | 46 | 12,000 | 128 | 10 | 21.4 | 61 |
| 12-I | Atlas G-711 | 40 | 33 | 12,000 | 133 | 8 | 19.7 | 57 |
| 12-J | Igepon TK-32 | 40 | 64 | 12,000 | 292 | 25 | 19.5 | 132 |

[a] Amount indicates weight in grams as active material.
[b] Using greater quantities gave no improvement.

TABLE 10

| Example | Surface active agents Name | Amount[a] | Name | Amount[a] | Stirring time (mins.) | Volume (ml.) | Viscosity (cps.) | Days to set firm | Density (lbs./ft.³) | Flexural strength (p.s.i.) |
|---|---|---|---|---|---|---|---|---|---|---|
| 13-B | Dowfax 2A-1 | 20 | DuPonol G | 20 | 15 | 11,500 | 103 | 3 | 14.9 | 19 |
| 13-C | Sarkosyl NL-97 | 20 | do | 20 | 75 | 11,500 | 140 | 17 | 15.2 | 56 |
| 13-D | Lathanol LAL | 20 | do | 20 | 40 | 10,400 | 257 | 4 | 15.6 | 37 |
| 13-E | Stepanol T-28 | 20 | do | 20 | 30 | 12,000 | 283 | 8 | 14.0 | 50 |
| 13-F | DuPonol LS | 20 | do | 20 | 39 | 12,000 | 274 | 4 | 13.3 | 49 |
| 13-G | Maprofix TLS-500 | 20 | do | 20 | 45 | 12,000 | 303 | 4 | 14.1 | 86 |
| 13-H | DuPonol ST | 20 | do | 20 | 62 | 11,500 | 289 | 3 | 13.9 | 97 |
| 13-I | Steol CS-460 | 20 | do | 20 | 14 | 12,000 | 238 | 3 | 13.5 | 69 |
| 13-J | Steol 4N | 20 | do | 20 | 14 | 12,300 | 206 | 2 | 12.5 | 33 |

[a] As active material.

TABLE 11

| Example | Surface active agents Nonionic Name | Amount | Anionic Name | Amount[a] | Stirring time (mins.) | Volume (ml.) | Viscosity (cps.) | Days to set firm | Density (lbs./ft.³) | Flexural strength (p.s.i.) |
|---|---|---|---|---|---|---|---|---|---|---|
| 16-1 | Alrosol C | 20 | Alkanol 89-S | 20 | 120 | 9,000 | 373 | 5 | 18.1 | 130 |
| 16-2 | do | 20 | DuPonol G | 10 | 50 | 10,500 | 283 | 2 | 13.4 | 47 |
| 16-3 | do | 10 | do | 20 | 29 | 12,000 | 310 | 4 | 13.7 | 54 |
| 16-4 | Cedemide D | 20 | do | 20 | 30 | 14,100 | 345 | 4 | 11.6 | 57 |
| 16-5 | Cedemide C | 20 | do | 20 | 40 | 12,000 | 330 | 4 | 13.9 | 59 |
| 16-6 | Ninol 201 | 20 | do | 20 | 58 | 12,500 | 294 | 3 | 13.1 | 62 |
| 16-7 | Super Amide O-9 | 20 | do | 20 | 48 | 12,300 | 308 | 3 | 12.8 | 51 |
| 16-8 | Super Amide GR | 20 | do | 20 | 48 | 12,300 | 308 | 3 | 13.5 | 52 |
| 16-9 | Onyxol 42 | 20 | do | 20 | 110 | 10,000 | 375 | 3 | 14.8 | 67 |
| 16-10 | Onyxol 345 | 20 | do | 20 | 40 | 12,000 | 320 | 3 | 13.3 | 45 |
| 16-11 | Alrosol C | 20 | Tergitol 4 | 20 | 40 | 12,200 | 421 | 4 | 13.6 | 72 |
| 16-12 | do | 20 | Tergitol 7 | 20 | 55 | 12,200 | 330 | 8 | 13.7 | 68 |
| 16-13 | do | 20 | do | 10 | 42 | 12,100 | 357 | 2 | 13.0 | 67 |
| 16-14 | do | 20 | Triton X-301 | 20 | 50 | 12,800 | 309 | 3 | 11.3 | 40 |
| 16-15 | do | 20 | Neutronyx S-60 | 20 | 23 | 12,300 | 226 | 3 | 12.2 | 45 |
| 16-16 | do | 20 | Sulframin 80 | 20 | 30 | 12,000 | 309 | 7 | 14.3 | 79 |
| 16-17 | do | 20 | Sulframin 40 | 20 | 60 | 12,800 | 375 | 5 | 13.0 | 47 |
| 16-18 | do | 20 | Arctic Syntex M | 20 | 48 | 12,200 | 310 | 6 | 13.7 | 71 |
| 16-19 | do | 20 | Ninate 411 | 20 | 72 | 12,200 | 310 | 6 | 13.5 | 74 |
| 16-20 | do | 20 | Ultrawet K | 20 | 47 | 12,200 | 358 | 8 | 14.3 | 71 |
| 16-21 | do | 20 | Igepon TN-74 | 20 | 45 | 10,200 | 200 | 4 | 16.3 | 56 |
| 16-22 | Plurafac A-24 | 20 | DuPonol G | 20 | 57 | 12,100 | 378 | 4 | 12.9 | 57 |
| 16-23 | Tergitol 15-S-12 | 20 | do | 20 | 46 | 10,100 | 264 | 3 | 14.5 | 45 |
| 16-24 | Pluronic L-64 | 20 | do | 20 | 90 | 10,100 | 453 | 7 | 13.9 | 43 |
| 16-25 | Neutronyx 600 | 20 | do | 20 | 65 | 9,700 | 326 | 2 | 15.2 | 60 |
| 16-26 | Triton X-100 | 20 | do | 20 | 64 | 10,100 | 355 | 3 | 14.7 | 41 |
| 16-27 | Renex 648 | 20 | do | 20 | 105 | 11,500 | 400 | 4 | 13.7 | 59 |
| 16-28 | Amidox L-2 | 20 | do | 20 | 29 | 12,200 | 310 | 3 | 13.2 | 41 |
| 16-29 | Amidox C-2 | 20 | do | 20 | 44 | 12,100 | 275 | 2 | 12.9 | 51 |
| 16-30 | Ethofat C-25 | 20 | do | 20 | 62 | 8,000 | 404 | 2 | 18.3 | 76 |
| 16-31 | Glycosperse TO-20 | 20 | do | 20 | 60 | 8,700 | 301 | 4 | 17.7 | 103 |
| 16-32 | Nonisol 200 | 20 | do | 20 | 83 | 9,700 | 388 | 5 | 16.5 | 90 |
| 16-33 | Nonisol 210 | 20 | do | 20 | 75 | 8,800 | 332 | 3 | 18.0 | 75 |
| 16-34 | Chemactant S-16 | 20 | do | 20 | 51 | 9,000 | 293 | 2 | 15.5 | 65 |
| 16-35 | Atlas G-1795 | 20 | do | 20 | 27 | 9,100 | 241 | 4 | 17.7 | 56 |
| 16-36 | Atlas G-1295 | 20 | do | 20 | 66 | 8,200 | 290 | 4 | 18.0 | 87 |
| 16-37 | Armotan PML 20 | 20 | do | 20 | 46 | 8,300 | 326 | 2 | 17.7 | 45 |
| 16-38 | Ammonyx LO | 20 | do | 20 | 25 | 12,400 | 253 | 4 | 12.8 | 41 |
| 16-39 | do | 20 | Ultraphos 21A | 20 | 8 | 12,700 | 96 | 8 | 15.9 | 9 |
| 16-40 | Tergitol 12-M-10 | 20 | DuPonol G | 20 | 50 | 9,900 | 332 | 3 | 14.5 | 51 |

[a] As active material.

I claim:

1. A lightweight rigid cementitious composition consisting essentially of a cementitious material comprising Portland cement, chemically opened asbestos fibers and at least 5 percent by weight of said fiber of an anionic surface active agent capable of chemically opening the fiber and resistant to alkalinity and saponification, said composition having a density of 3 lbs/ft³ to 35 lbs/ft³.

2. A product as defined in claim 1 wherein said surface active agent is present in an amount of 0.5 percent or more by weight active ingredient based on the weight of cementitious material.

3. A product as defined in claim 1 wherein said fibers are present at least in a ratio of 10–20 parts for 100 parts cementitious material.

4. A product as defined in claim 3 wherein said ratio is 30–40 parts.

5. A product as defined in claim 1 wherein said fibers are present at least in a ratio of 2.25–4.5 parts for 100 parts cementitious material.

6. A product as defined in claim 1 wherein said ratio is 3–6 parts.

7. A product as defined in claim 1, wherein said fibers are present in a ratio of 2.25 parts to 40 parts for 100 parts cementitious material.

8. A product as defined in claim 7 wherein said fibers are present in a ratio of 3 to 6 parts for 100 parts cementitious material and the product obtained has a density in the higher part of the range.

9. A product as defined in claim 7 wherein said fibers are present in a ratio of 30 to 40 parts for 100 parts cementitious material and the product obtained has a density in the lower part of the range.

10. A product as defined in claim 1, said product being cellular.

11. A product as defined in claim 10 which also includes a sequestering agent selected from the group consisting of water soluble salts of hexametaphosphate, ethylenediamine tetraacetic acid, tripolyphosphate and nitrilotriacetic acid.

12. A product as defined in claim 10 which also includes a nonionic or amphoteric surface active agent resistant to alkalinity and saponification.

13. A product as defined in claim 10 which also includes a colloidal dispersion.

14. A product as defined in claim 13 wherein said colloidal dispersion is silica sol or a resin latex.

15. A product as defined in claim 13 wherein said colloidal dispersion includes a resin latex of the vinyl-acrylic type.

16. A product as defined in claim 1 wherein said surface active agent is selected from the class consisting of sulfonated aromatic hydrocarbons ethoxylated alkyl phenols, sulfated ethoxylated alkyl phenols, phosphate surface active agents, alcohol sulfates, naphthalene sulfates, ethoxylated alcohol sulfates and taurates.

17. A product as defined in claim 16 wherein said surface active agent is an alkyl sulfonate, a sulfonate of naphthalene or alkyl naphthalene, or a dodecyl or tridecyl benzene sulfonate.

18. A product as defined in claim 1 wherein said cementitious material further comprises at least one of diatomaceous earth, silica flour and quicklime.

19. A product as defined in claim 1 wherein said cementitious material also includes ciment fondu.

20. A product as defined in claim 19 wherein said cementitious material further comprises at least one of diatomaceous earth and silica flour.

21. A product as defined in claim 16, also including an auxiliary anionic surface active agent selected from the group consisting of diphenyl sulfonates, ethoxylate alcohols, sarcosine derivatives.

22. A product as defined in claim 12 wherein said surface active agent is selected from the group consisting of betaine derivatives, imidazoline-type products, alkanolamides, ethoxylated alcohols, fatty esters, oils, fatty acids, amines, amides and alkyl phenols, glycol esters, lanolin, sorbitan derivatives, thio derivatives, mercapto derivatives, monoglycerides and derivatives, tert-amine oxides.

23. A process for producing a lightweight cementitious product which comprises mixing water, a cementitious material comprising Portland cement, asbestos fiber and at least 5 percent by weight of said fiber of an anionic surface active agent capable of chemically opening the fiber and resistant to alkalinity and saponification, said mixture having a ratio of cementitious material to water of from about 1:1½ to about 1:15, said fiber being present in a ratio of at least 0.8 – 1.6 parts per 100 parts of water, and curing said mixture.

24. A process for producing a lightweight rigid cellular, cementitious product which comprises mixing water, a cementitious material comprising Portland cement, asbestos fiber and at least 5 percent by weight of said fiber of an anionic surface active agent capable of chemically opening the fiber and resistant to alkalinity and saponification, said mixture having a ratio of cementitious material to water of from about 1:1½ to about 1:15, said fiber being present in a ratio of at least 0.8 – 1.6 parts per 100 parts of water, causing aeration to take place, and curing said mixture.

* * * * *